United States Patent Office 3,025,284
Patented Mar. 13, 1962

3,025,284
POLYMERIZATION OF VINYL CHLORIDE
Paul J. George and Marvin R. Frederick, Brecksville, Ohio, assignors to The B. F. Goodrich Company, New York, N.Y., a corporation of New York
No Drawing. Filed Feb. 3, 1958, Ser. No. 712,683
18 Claims. (Cl. 260—92.8)

This invention relates to a process for the directed polymerization of vinyl chloride and especially to novel highly effective catalyst systems for directing the polymerization of vinyl chloride and to novel and efficient reaction media in which said polymerizations are carried out.

The recent developments of alkyl aluminum catalysts for the polymerization of the ethylenes have now achieved wide use in the manufacture of the polyethylenes. However, these earlier alkyl aluminum catalysts are not effective in the polymerization of vinyl chloride, and are moreover restricted to carrying out the polymerization in an anhydrous media. Further, these earlier alkyl metal catalysts are not stable in the presence of vinyl chloride, and for this reason also cannot be used as catalysts in the polymerization of vinyl chloride.

Applicants have engaged in extensive research in the field of polymerization of vinyl monomers during the past two years and as a result of that research have discovered novel catalyst systems which are highly effective in directing the polymerization of vinyl chloride, and are furthermore highly versatile, being capable of functioning in aqueous media, at very low temperatures and at low catalyst levels, and of resulting in high conversions in relatively short times. Of prime importance is the fact that the catalyst systems of this invention are stable in the presence of the vinyl chloride, a quality essential to effective polymerization of vinyl chloride, and which the prior alkyl metal catalyst systems are not. A great advantage of the catalyst systems of this invention resides in the control of the polymerization processes that can be attained by a regulation of the catalyst level and/or the temperature of the reaction.

While it presently appears that the catalyst systems of this invention are not limited to the direction of the polymerization of vinyl chloride, they are outstanding in that field. This application is for that reason directed to the polymerization of vinyl chloride to produce polyvinyl chlorides of controlled molecular weight and softening and flow temperatures in relatively short times and in high yields.

The catalyst systems which applicants have found to be most effective comprise an alkyl borane as a catalyst, and as a co-catalyst a hydroperoxide of the formula ROOH, in which R is hydrogen or a hydrocarbon radical. These constitute completely new co-catalyst:catalyst systems for the polymerization of vinyl chloride and function with a high degree of efficiency in comparison with prior known catalysts for vinyl chloride. The catalyst systems of this application are sometimes herein generically referred to as alkyl borane catalyst:co-catalyst systems, the term "alkyl borane" having been accepted as the proper designation for an alkyl of boron. (See Boron Nomenclature in Chem. & Eng. News, vol. 32, p. 1442, 1954.)

It is here pointed out that alkyl boranes do not react with water in the absence of oxygen and in that respect the alkyl boranes differ from all other alkyl metals of the group III elements, which do react vigorous with water. Since the alkyl boranes are unique in this respect, polymerizations of vinyl chloride utilizing the alkyl borane catalyst:co-catalyst systems of this application may consequently be carried out in an aqueous media, either the catalyst or the co-catalyst being last added in situ to all the other constituents in the polymerization chamber.

With alkyl boranes, as with other alkyl metals, the danger of inflammation or oxidation of the alkyl borane must be avoided by keeping the alkyl borane free of oxygen and of contact with oxygen and air, which necessitates the same precautions necessary in the manufacture, storing and handling of other alkyl metals, by thoroughly flushing out the polymerization chamber with pure $N_2$ before charging the polymerizer and by providing protection during the charging and the reaction, as by providing a blanket of $N_2$, or other non-reactive gas, continuously in the chamber, so that no oxygen or air is available for reaction with the alkyl borane. Each of the several constituents charged into the polymerization chamber must also be free of molecular oxygen or of any material which will carry available oxygen into the polymerization chamber, except only for the co-catalyst, the function of which is to cooperate with the alkyl borane catalyst in situ within the liquid reaction media within the polymerization chamber.

The alkyl borane catalysts may be any one of the many alkyl boranes, such as triethyl borane, a tripropyl borane, a tributyl borane and other higher alkyl boranes. However, from the standpoint of economy and safety, both in the cost of the alkyl borane and in minimizing the hazards incident to the handling of alkyl boranes, triisobutyl borane presently seems to be preferable.

The hydroperoxide co-catalyst of the ROOH type may be hydrogen peroxide, methyl hydroperoxide, ethyl hydroperoxide, a propyl hydroperoxide, a butyl hydroperoxide, cumene hydroperoxide, or other alkyl hydroperoxides.

The liquid reaction media in which the alkyl borane catalyst:co-catalyst systems are highly effective in the polymerization of vinyl chloride, such media being generically termed aqueous reaction media, comprise water alone and intimate admixtures of water with one or more organic solvents such as the alcohols including methyl, ethyl, a propyl, a butyl, an amyl, a hexyl, a heptyl, an octyl, methyl hexyl, dimethyl hexyl, and other alcohols, including the polyhydric alcohols, such as glycol, glycerol and the like; an alkyl nitrile, such as acetonitrile, ethylene cyanohydrin and the like; the ethers, as methyl, ethyl, a propyl, a butyl and higher ethers, tetrahydrofuran and the like; the ketones, such as acetone, methyl ethyl ketone, cyclohexanone, and the like.

It is advantageous, although not essential, to add to the liquid reaction media a small amount of a dispersant in order to obtain a more complete and uniform dispersal of the vinyl chloride and catalyst system throughout the reaction media prior to and during the polymerization of the vinyl chloride. Any of the well known dispersants operative in aqueous media may be employed. These include, among others, methyl cellulose, polyvinyl alcohol, dodecylamine hydrochloride, sodium lauryl sulfonate, lauryl alcohol, sorbitan monolaurate polyoxyethylene, nonylphenoxy polyoxyethylene ethanol, hydrolyzed polyvinyl acetate, all of which are effective dispersants in the polymerization reaction of this application. In order to secure a better correlation of the other components of the polymerization reaction, methyl cellulose, such as is marketed by Dow Chemical Co. under the trade name "Methocel 4000," a methyl cellulose having a viscosity of 4000 centipoises in 2% water solution at 25° C., is employed as the dispersant in each of the examples herein given.

The polymerized vinyl chloride of the invention of this application, in which an alkyl borane catalyst is brought into contact with a co-catalyst of the hydroperoxide type, in situ within the liquid reaction medium containing dispersed therethrough the vinyl chloride, are normally produced at low catalyst:co-catalyst levels of the order of from about 0.02% to about 0.2% of catalyst:co-catalyst based on the vinyl chloride and at low temperatures ranging from −78° C. to 50° C., conditions under which conventional prior art catalysts function poorly or not at all, and in much longer times. The resulting polymerized vinyl chloride possesses superior properties, especially in increased high temperature stability and in heat distortion temperature.

GENERAL EXAMPLE

Materials

The materials used in carrying out the polymerization in the production of polyvinyl chloride as disclosed in this application are (a) vinyl chloride, (b) a reaction medium, comprising water or water and one or more organic solvents, (c) a dispersant, (d) a catalyst, and (e) co-catalyst. All materials used in the polymerization are carefully purified. The vinyl chloride is pure grade and is distilled out of the storage cylinder in which it is delivered. The water is redistilled, deaerated by boiling for one-half hour and then cooled under a nitrogen blanket, or cooled by bubbling a stream of $N_2$ through the water, all nitrogen used in the polymerization being freed of impurities. Organic solvents are redistilled and deaerated in the same manner. The dispersant solutions are deaerated by heating to 80° C. and passing a nitrogen stream through the dispersant solution for about one-half hour. The alkyl boranes are normally used as pure distilled liquids. The hydrogen peroxide is used as a solution in deaerated water, and the alkyl hydroperoxides as solutions in a deaerated organic solvent.

Procedures

The materials are charged into the polymerization chamber, which may be any of the polymerization receptacles commonly used for such reactions, the polymerization chamber having preferably been first purged with nitrogen to remove all traces of air, the materials being added in either of the following orders:

*Procedure A.*—First, the vinyl chloride, then the components of the reaction medium, such as water, organic solvent, and the dispersant (the reaction medium and dispersant may be admixed before charging), the alkyl borane catalyst and last the ROOH co-catalyst. Normally, an excess of vinyl chloride is first added to the polymerization chamber, and the chamber closed with a cap. The components of the reaction medium and dispersant are then added to the polymerization chamber through the cap by means of a hypodermic syringe. Any excess of vinyl chloride is vented through a needle inserted through the cap, leaving a blanket of vinyl chloride gas overlying the polymerizer contents.

*Procedure B.*—A somewhat altered procedure may be used for charging the polymerizer. In such a procedure, the reaction medium and dispersant are first charged into the polymerizer and the latter kept for 30 to 40 minutes in a cold chest at −30° C. The vinyl chloride is then added and a copious boiling of the vinyl chloride results, thereby achieving satisfactory purging of the polymerizer and its contents of air, leaving a blanket of vinyl chloride overlying the polymerizer contents. The polymerizer is then capped.

It is to be understood, however, that the invention of this application is not limited to the above indicated specific procedures.

In any case, either the catalyst or the co-catalyst is last added through the cap, as by a hypodermic syringe, to complete the catalyst:co-catalyst system of this application, then the polymerizer is placed in a suitable bath which is preferably maintained throughout the polymerization at a predetermined temperature.

Recovery

When the polymerization has been completed, or has neared completion, the polymerized vinyl chloride, or polyvinyl chloride as it is commonly called, is recovered from the contents of the polymerization chamber. Any of a number of known procedures may be used. For example, blowing a stream of air through the contents of the polymerization chamber to oxidize the alkyl borane residues to boric acid, or alternatively adding excess hydrogen peroxide to the polymerizer contents to accomplish the same purpose; then extracting the residues by solvents, such as methanol, ethanol, hexane and the like, generally in combination with water extractions, a satisfactory procedure being successive washings with water, alcohol and hexane. The recovered polyvinyl chloride is then dried in a vacuum oven for a period of time at a somewhat elevated temperature to yield dry fine white pearl-like granules of polyvinyl chloride.

As illustrative of the effect of temperature in the polymerization of vinyl chloride in the aqueous reaction media above indicated and in the presence of the co-catalyst: catalyst systems of this application, (a) Polymerizations as disclosed in this application, when carried out at from about 40° C. to about 50° C. produce in a remarkably short time, from about 1.5 to 3 hours, high yields of polyvinyl chlorides ranging from about 80% to 97% and of a quality equal or superior to presently available commercial polyvinyl chlorides, which normally require from 16 to 24 hours to polymerize, when using the prior known catalysts of polymerization for vinyl chloride;

(b) Polymerizations as disclosed in this application when carried out at from about 0° C. to about 30° C., produce high yields of polyvinyl chlorides of highest quality in from 3 to 15 hours;

(c) Polymerizations as disclosed in this application, when carried out at from about −40° C. to 0° C. yield in 15 hours or more a polyvinyl chloride of distinctive properties, as of a much higher molecular weight, of less distortion at higher temperatures and of higher dielectric constants.

For the purpose of evaluating the properties of the polyvinyl chlorides produced in accord with the improved process of this invention, the intrinsic viscosity value, which is a measure of molecular weight, and the dynamic extrusion test to determine the "consolidation temperature" which is a measure of the softening or distortion temperature, and "flow temperature" which is a measure of the processability of the polyvinyl chlorides, have been deemed to be adequate indicators of quality of each of the polyvinyl chlorides described herein as illustrative of the novel and superior process of this application for the commercial manufacture in high yields of high quality polyvinyl chlorides.

As used herein the terms "specific viscosity" and "intrinsic viscosity" are calculated values derived from viscosity measurements. Solutions for viscometric study are prepared by dissolving 0.125 gram of the polyvinyl chloride in 100 ml. of cyclohexanone while mildly heating and agitating on a solution roller. The solutions are then filtered into an appropriate Ubbeholde viscometer, previously calibrated for the pure solvent. The flow times in seconds for the solutions are determined at three different dilutions to obtain flow data at a number of concentrations. The ratio of the flow time to the flow time of the pure solvent is a value known as the "reduced viscosity." When the integer 1 is substracted from "reduced viscosity," one obtains the value known as the "specific viscosity." When the "specific viscosity" is divided by the concentration and the values obtained plotted against concentration, the extrapolation of the resulting straight line to zero concentration gives one the value known as "intrinsic viscosity." The intrinsic viscosity value of a polyvinyl chloride so determined is indicative of the approximate molecular weight of the polyvinyl chloride. Thus, an intrinsic viscosity value of 0.2 corresponds to a molecular weight of approximately 8,800; a value of 1.0, a molecular weight of about 58,000; a value of 2.0, a molecular weight of about 120,000; a value of 3.0, a molecular weight of about 190,000. Since the relation between the intrinsic viscosity values and molecular weights is a straight line function, the approximate molecular weight of any polyvinyl chloride may be readily calculated from the intrinsic viscosity value of that polyvinyl chloride.

As used herein, the term "dynamic extrusion" refers to a standardized test procedure for determining the "consolidation temperature" or $T_1$ value, and the "flow temperature" or $T_2$ value, of a polyvinyl chloride being tested. In this test, a sample of dry finely divided polyvinyl chloride, resulting from a polymerization of the character above described, is placed in a temperature-controlled plunger cavity mold having an orifice of 1/16" in diameter in the bottom of the cavity. A constant pressure of about 3000 lbs. per square inch is applied to the polyvinyl chloride in the cavity by means of the plunger. The mold is then gradually heated up until (1) the finely divided polyvinyl chloride consolidates to a solid mass, the temperature at which this occurs being the "consolidation temperature" or $T_1$ value, and (2) then the gradual heating up continues until the consolidated mass begins to flow readily through the orifice, the temperature at which this occurs being the "flow temperature" or $T_2$ value. The "consolidation temperature," or $T_1$ value, is indicative of the softening or distortion temperature of the polyvinyl chloride. The "flow temperature," or $T_2$ value, is indicative of the processability of the polyvinyl chloride, a factor important in determining the usefulness of the polyvinyl chloride.

EXAMPLE I

Following the procedure in the general example, procedure A, a polymerizer is charged with

| | |
|---|---|
| Monomer, vinyl chloride, gm. | 150 |
| Reaction medium: | |
|     Water, ml. | 150 |
|     Ethyl alcohol, ml. | 150 |
| Dispersant, 1% sol. methyl cellulose in water, ml. | 9 |
| Catalyst, triisobutyl borane, ml. (0.4 mM./Mvcl)[1] | 0.24 |
| Co-catalyst, 3% sol. hydrogen peroxide,[2] ml. (2.8 mM./Mvcl)[1] | 7.5 |

[1] mM./Mvcl indicates millimoles of catalyst or co-catalyst per 1 mole of vinyl chloride.
[2] Solution in deaerated water.

The polymerizer is placed in a suitable bath maintained at 30° C. for 1.5 hours at which time the polymerization appears to be near completion. On venting, very little vinyl chloride is present. Bubble air through the polymerizer contents for 10 minutes, then add 200 ml. of ethyl alcohol. Filter and wash with ethyl alcohol and water. Transfer fine solid particles to 2000 ml. flask, add 500 ml. of ethyl alcohol, bubble air through the flask contents, and after raising the temperature of the flask contents to 60° C., continue for 10 minutes to bubble air through contents of flask; filter again and let stand in hexane; then finally filter and dry in a vacuum oven at 50° C. for 16 hours. Test for intrinsic viscosity, and for dynamic extrusion value. Summarizing:

| | |
|---|---|
| Bath temperature, ° C. | 30 |
| Polymerization time, hrs. | 1.5 |
| Yield, percent white, fine pearl-like granules | 89.5 |
| $T_1$, ° C. | 93 |
| $T_2$, ° C. | 151 |
| Intrinsic viscosity, 1.16 or approx. mol. wt. 68,000. | |

This Example I is illustrative of the novel process of this application in which a high yield of a superior grade of polyvinyl chloride is produced in a remarkably short time.

EXAMPLE II

Following the procedure in Example I, but utilizing as the catalyst tri-n-butyl borane in place of triisobutyl borane, the following results are obtained.

| | |
|---|---|
| Monomer, vinyl chloride, gm. | 100 |
| Reaction medium: | |
|     Water, ml. | 150 |
|     Ethyl alcohol, ml. | 150 |
| Dispersant, 1% sol. methyl cellulose, ml. | 9 |
| Catalyst, tri-n-butyl borane, ml. | [1] 0.24 |
| Co-catalyst, 3% sol. $H_2O_2$ in water,[2] ml. | [1] 7.5 |

[1] and [2], same as in Example I.

Proceeding as in Example I, white fine pearl-like granules are obtained. Summary:

| | |
|---|---|
| Bath temperature, ° C. | 30 |
| Polymerization time, hrs. | 1.5 |
| Yield, percent | 86 |
| $T_1$, ° C. | 101 |
| $T_2$, ° C. | 151 |
| Intrinsic viscosity, 1.23 or approx. mol. wt. 70,000. | |

EXAMPLE III

Utilizing a different reaction medium, this example is illustrative of high yield in the relatively short time of 3 hours.

| | |
|---|---|
| Monomer, vinyl chloride, gm. | 100 |
| Reaction medium: | |
|     Water, ml. | 200 |
|     Acetonitrile, ml. | 50 |
|     Ethyl alcohol, ml. | 50 |
| Dispersant, 1% sol. methyl cellulose, ml. | 9 |
| Catalyst, triisobutyl borane, ml. (0.4 mM./Mvcl)[1] | 1.2 |
| Co-catalyst, 3% sol. $H_2O_2$ in water,[2] ml. | [1] 3.7 |

[1] and [2], same as in Example I.

Summarizing the procedure and the results:

| | |
|---|---|
| Bath temperature, ° C. | 30 |
| Polymerization time, hrs. | 3 |
| Yield, percent of white fine pearl-like granules | 91 |
| $T_1$, ° C. | 89 |
| $T_2$, ° C. | 156 |
| Intrinsic viscosity, 1.34 or approx. mol. wt. 78,000. | |

EXAMPLE IV

This example is illustrative of the polymerization at lower temperatures to yield higher molecular weight polyvinyl chloride. The procedure is the same as in Example I.

| | |
|---|---|
| Monomer, vinyl chloride, gm. | 150 |
| Reaction medium: | |
|     Water, ml. | 150 |
|     Ethyl alcohol, ml. | 150 |
| Dispersant, 1% sol. methyl cellulose, ml. | 9 |
| Catalyst, triisobutyl borane, ml. | [1] 0.24 |
| Co-catalyst, 3% $H_2O_2$ in water,[2] ml. | [1] 7.5 |

[1] and [2], same as in Example I.

Summarizing the procedure and the results:

| | |
|---|---|
| Bath temperature, ° C. | 5 |
| Polymerization time, hrs. | 4.75 |
| Yield, percent of white, fine pearl-like granules | 90 |
| $T_1$, ° C. | 104.5 |
| $T_2$, ° C. | 164 |
| Intrinsic viscosity, 1.84 or approx. mol. wt. 108,000. | |

It will be noted that in the process of this Example IV carried out at a lower temperature produced a polyvinyl chloride of higher softening or distortion temperature, one of higher flow temperature and one of higher molecular weight.

EXAMPLE V

This example illustrates the utilization of another reaction medium at a still lower temperature to produce a high yield of a fine white granular polymer. The procedure is the same as in Example I.

Monomer, vinyl chloride, gm. _____ 100
Reaction medium:
    Water, ml. _____ 200
    Acetonitrile, ml. _____ 50
    Methyl alcohol, ml. _____ 50
Dispersant, 1% sol. methyl cellulose, ml. _____ 10
Catalyst, triisobutyl borane, ml. _____ [1] 1.4
Co-catalyst, 30% sol. $H_2O_2$ in water,[2] ml. _____ [1] 0.4

[1] and [2], same as in Example I.

Summarizing:
Bath temperature, °C. _____ 0
Polymerization time, hrs. _____ 6.5
Yield, percent white, fine granular polymer ___ 97
$T_1$, °C. _____ 102
$T_2$, °C. _____ 171
Intrinsic viscosity, 1.59 or approx. mol. wt. 97,000.

EXAMPLE VI

This example illustrates another alkyl hydroperoxide as a co-catalyst in an alkyl borane catalyst: co-catalyst system, following the procedure of Example I.

Monomer, vinyl chloride, gm. _____ 100
Reaction medium:
    Water, ml. _____ 100
    Ethyl alcohol, ml. _____ 100
Dispersant, 1% sol. methyl cellulose, ml. _____ 5
Catalyst, triisobutyl borane,[1] ml. _____ 3.2
Co-catalyst, cumene hydroperoxide,[2] ml. _____ 3.2

[1] Solution in hexane, 1 ml.=0.2 mM.
[2] Solution in hexane, 1 ml.=0.2 mM.

Summary:
Bath temperature, °C. _____ 30
Polymerization time, hrs. _____ 19
Yield, percent white fine particles _____ 88
$T_1$, °C. _____ 93.5
$T_2$, °C. _____ 153
Intrinsic viscosity, 1.58 or approx. mol. wt. 97,000.

EXAMPLE VII

This example illustrates the use of an alkyl hydroperoxide as co-catalyst in a process following that of Example I.

Monomer, vinyl chloride, gm. _____ 100
Reaction medium:
    Water, ml. _____ 125
    Acetonitrile, ml. _____ 125
Dispersant, 1% sol. methyl cellulose, ml. _____ 5
Catalyst, triisobutyl borane, ml. _____ [1] 2.4
Co-catalyst, t-butyl hydroperoxide, ml. _____ [2] 2.0

[1] In hexane solution, 1 ml. soln. =0.2 mM. catalyst.
[2] In ethyl alcohol solution, 1 ml. soln.=0.1 mM. co-catalyst.

Summarizing:
Bath temperature, °C. _____ 30
Polymerization time, hrs. _____ 9
Yield, percent white fine particle granules _____ 83
$T_1$, °C. _____ 91
$T_2$, °C. _____ 147
Intrinsic viscosity, 1.32 or approx. mol. wt. 77,000.

EXAMPLE VIII

This example illustrates the carrying out of the polymerization of this application in a medium consisting of water alone, rather than a mixture of water and organic solvent, as disclosed in the preceding examples, but otherwise following the procedure of Example I.

Monomer, vinyl chloride, gm. _____ 100
Reaction medium, water ml. _____ 300
Dispersant:
    Hydrolyzed vinyl acetate, gm. _____ [1] 0.15
    Gelatin, gm. _____ [2] .05
Catalyst, triisobutyl borane, ml. _____ [3] .06
Co-catalyst, 3% sol. hydrogen peroxide ml. ____ [4] 1.9

[1] Water solution in 25 ml. of water.
[2] Water solution in 1 ml. of water.
[3] Solution in hexane, 1 ml.=0.4 mM.
[4] Solution of fresh $H_2O_2$ in water.

Summarizing:
Bath temperature, °C. _____ 30
Polymerization time, hrs. _____ 23
Yield, 85 percent fine pearl-like granules _____ 85
$T_1$, °C. _____ 104
$T_2$, °C. _____ 157

It is noted that, in the above Example VIII, there is produced a polyvinyl chloride of high yield and of excellent physical properties, as shown by the character of granules and the excellent $T_1$–$T_2$ values. The time of polymerization is longer than where a water-solvent reaction medium is employed, but otherwise the polymerization compares favorably to the polymerization of the preceding examples.

TABLE I

CO-CATALYST: CATALYST RATIOS

Examples are here recorded in tabular form to show that triisobutyl borane alone is not a catalyst for the polymerization of vinyl chloride, and that the ratio of co-catalyst to catalyst is not critical. The following recipe is employed for these tests.

Monomer, vinyl chloride, gm. _____ 10
Reaction medium:
    Water, ml. _____ 10
    Ethyl alcohol, ml. _____ 10
Dispersant, 1% sol. methyl cellulose, ml. _____ 0.5
Catalyst, triisobutyl borane, ml.
  (1 ml.=0.2 mM.)_____ 0.32
Co-catalyst, t-butyl hydroperoxide __ As indicated below.

| Polym. No. | ml. ROOH Co-Catalyst | Ratio $\frac{mM.\ Co\text{-}Catalyst}{mM.\ Catalyst}$ | Yield, Percent |
|---|---|---|---|
| A | None | 0 | None |
| B | 0.15 | 0.25 | 11.5 |
| C | 0.3 | 0.5 | 85.5 |
| D | 0.45 | 0.75 | 88 |
| E | 0.6 | 1.0 | 91 |
| F | 0.75 | 1.25 | 90 |
| G | 0.9 | 1.5 | 92.5 |
| H | 1.2 | 2.0 | 90 |
| I | 3.0 | 5.0 | 92 |
| J | 4.2 | 7.0 | 93 |
| K | 22.0 | 40.0 | 90 |

From the above tabulation, it is evident that any ratio higher than about 0.5 co-catalyst to 1.0 catalyst gives high yields of polyvinyl chloride and that higher ratios of co-catalyst to catalyst are permissible without detracting from the yield. A similar test with hydrogen peroxide gives similar results. It is thus demonstrated that excess of a ROOH co-catalyst above about a 0.5 ratio does not adversely affect the polymerization of vinyl chloride utilizing the invention of this application.

TABLE II

POLYMERIZATION YIELDS AT DIFFERENT CATALYST LEVELS.

The catalyst level, or the ratio in millimoles of triisobutyl borane to one mole of vinyl chloride, represented by mM./Mvcl., in the table below, is not critical, as is shown in the following test polymerizations:

| Polym. No. | mM/Mvcl. | Yield, Percent | Reaction Media |
|---|---|---|---|
| A | 0.5 | 85.5 | $H_2O$—$CH_3CN$ |
| B | 0.1 | 88 | $H_2O$—$CH_3OH$ |
| C | 0.2 | 90 | $H_2O$—$CH_3OH$ |
| D | 0.3 | 92 | $H_2O$—$C_2H_5OH$ |
| E | 0.4 | 90 | $H_2O$—$C_2H_5OH$ |
| F | 0.7 | 93 | $H_2O$—$CH_3CN$ |

It is evident from the above tabulation that the catalyst level of triisobutyl borane to vinyl chloride is not critical, and that any raio of about 0.5 mM./Mvcl., is an effective catalyst.

TABLE III

As illustrative of the various aqueous media which are effective reaction vehicles for the polymerizations of this application, the following tests are here recorded in tabulated form:

Monomer, vinyl chloride, gm. _____ 10
Dispersant, 1% sol. methyl cellulose, ml. _____ 0.5
Catalyst, triisobutyl borane, ml. _____ [1] 0.24
Co-catalyst, hydroperoxide, ml. _____ [2] 0.2
Reaction medium, as indicated below, ml. _____ 30

| Polym. No. | Reaction Medium, 30 ml. Water/Solvents Ratio Indicated | Yield [3] percent |
|---|---|---|
| A | methyl alcohol 1:1 | 89.5 |
| B | ethyl alcohol 1:1 | 90.0 |
| C | acetonitrile 2:1 | 83.0 |
| D | glycol 2:1 | 86.0 |
| E | ethylene cyanohydrin 2:1 | 84.0 |
| F | glycerol 2:1 | 80.0 |
| G | acetone 2:1 | 92.0 |
| H | methyl ethyl ketone 2:1 | 89.5 |
| I | di-n-butyl ether 2:1 | 84.0 |
| J | cyclohexanone 2:1 | 86.0 |
| K | methyl alcohol, acetonitrile 4:1:1 | 97.0 |
| L | ethyl alcohol, acetonitrile 4:1:1 | 91.0 |
| M | chloroform, acetonitrile 4:1:1 | 81.0 |
| N | methyl alcohol, tetrahydrofuran 4:1:1 | 91.0 |
| O | ethyl alcohol, tetrahydrofuran 4:1:1 | 87.0 |
| P | acetonitrile, tetrahydrofuran 4:1:1 | 86.0 |

[1] In hexane, 1 ml. soln.=0.2 mM. catalyst.
[2] In ethyl alchol, 1 ml. soln.=0.1 mM. co-catalyst.
[3] All yields of 80% or above are considered to be high yields.

TABLE IV

VISCOSITY AND $T_1$–$T_2$ RELATIONSHIPS

Examples are here recorded in tabular form to set out the relationship of viscosity, molecular weight and $T_1$–$T_2$ values, based on the polymerization of vinyl chloride in the presence of the co-catalyst:catalyst system, comprising hydrogen peroxide:triisobutyl borane, of Example I, in the indicated reaction medium:

| Polym. No. | Intrinsic Viscosity | Approx. Mol. Wt. | Reaction Media | | |
|---|---|---|---|---|---|
| | | | $H_2O$ and $CH_3CN$ $T_1$–$T_2$ | $H_2O$ and $C_2H_5OH$ $T_1$–$T_2$ | $H_2O$ and $CH_3OH$ $T_1$–$T_2$ |
| A | 1.10 | 61,000 | 93–151 | 93–151 | |
| B | 1.17 | 68,000 | | 97–158 | |
| C | 1.23 | 70,000 | | 98–163 | |
| D | 1.27 | 75,000 | 92–153 | | |
| E | 1.34 | 78,000 | 102–154 | | |
| F | 1.50 | 88,000 | | 101–147 | |
| G | 1.59 | 97,000 | | | 99–155 |
| H | 1.67 | 100,000 | 106–171 | | |
| I | 1.84 | 108,000 | | 103–164 | |
| J | 1.99 | 120,000 | 103–168 | | |
| K | 2.23 | 132,000 | | | 104–170 |

The above tabulation is illustrative of the wide range of physical properties of polyvinyl chlorides which the polymerization process of this application is capable of producing, the combined properties of $T_1$ values or softening or distortion temperatures, of $T_2$ values, or flow temperatures indicative of processability, and molecular weights are of a character not normally attainable in the prior processes of polymerization of vinyl chloride.

From the above description, which is illustrative and not all inclusive, it has been made abundantly clear that tributyl boranes do not react with water in the absence of oxygen, and similarly that tributyl boranes do not of themselves initiate or activate the polymerization of vinyl chloride. Applicants have discovered and have amply demonstrated, as evidenced in the above specification, that butyl borane-hydroperoxide catalysts do initiate and activate the polymerization of vinyl chloride in an aqueous reaction medium, whether made up of water alone or of a water organic solvent medium, and that in the latter reaction medium the polymerization of vinyl chloride is effected in a short time with a high yield of high quality polyvinyl chloride.

Due to the large number of combinations and embodiments that fall within the scope and the spirit of the invention of this application, as set forth in the foregoing specification, the specific language and examples are not intended to be in limitation of the invention. All modifications and variations that will occur to the man skilled in the art are to be included, unless otherwise indicated, within the scope of the invention as disclosed in the specification and defined in the appended claims.

What is claimed is:

1. A process for producing polymerized vinyl chloride in the presence of a borane-hydroperoxide catalyst system in circumambient fluid media substantially inert to the borane of the catalyst system, which process comprises dispersing in an aqueous medium vinyl chloride, an alkyl borane having 2 to 4 carbon atoms, and a hydroperoxide of the formula ROOH, in which R is selected from the class consisting of hydrogen and hydrocarbon radicals having 1 to 8 carbon atoms, to form within the resulting aqueous admixture a borane-hydroperoxide catalyst system; then agitating the resulting aqueous admixture to permit the said catalyst system to initiate and to activate the polymerization of the vinyl chloride until a yield of polymerized vinyl chloride is attained; and recovering the granules of polymerized vinyl chloride thus produced.

2. The process in accord with claim 1 in which the alkyl borane is a butyl borane and the hydroperoxide is hydrogen peroxide.

3. The process in accord with claim 1 in which the alkyl borane is a butyl borane and the hydroperoxide is a butyl hydroperoxide.

4. The process in accord with claim 1 in which the alkyl borane is triisobutyl borane and the hydroperoxide is hydrogen peroxide.

5. A process for the polymerization of vinyl chloride in the presence of a borane-hydroperoxide catalyst system, which process is carried out in circumambient fluid media substantially inert to the borane of the catalyst system and comprises contacting vinyl chloride dispersed in an aqueous medium with a catalyst system prepared in situ in the said aqueous medium by admixing therein an alkyl borane having from 2 to 4 carbon atoms and a hydroperoxide of the formula ROOH, in which R is selected from the class consisting of hydrogen and hydrocarbon radicals having from 1 to 8 carbon atoms, to form within the resulting aqueous admixture a borane-hydroperoxide catalyst system in which the molar ratio of hydroperoxide to borane is higher than about 0.25 to 1.0, then agitating the resulting admixture until a yield of polymerized vinyl chloride is attained, and recovering the polymerized vinyl chloride thus produced.

6. The process in accord with claim 5 in which the borane is a butyl borane and the hydroperoxide is hydrogen peroxide.

7. The process in accord with claim 5 in which the borane is triisobutyl borane and the hydroperoxide is hydrogen peroxide.

8. The process in accord with claim 5 in which the borane is a butyl borane and the hydroperoxide is a butyl hydroperoxide.

9. A process for producing polymerized vinyl chloride in the form of fine pearl-like granules in the presence of a borane-hydroperoxide catalyst system, which process is carried out in circumambient fluid media substantially inert to the borane of the catalyst system and comprises dispersing in an aqueous medium, consisting essentially of water and organic solvent, vinyl chloride and an alkyl borane having from 2 to 4 carbon atoms, the ratio of borane to vinyl chloride being higher than 0.5 millimol of borane to 1 mol of vinyl chloride; thereafter admixing into said dispersion a hydroperoxide of the formula ROOH, in which R is selected from the class consisting of hydrogen and hydrocarbon radicals having from 1 to 8 carbon atoms, to form within the resulting aqueous admixture a borane-hydroperoxide catalyst system in which the molar ratio of hydroperoxide to borane is higher than 0.5 to 1.0, then agitating the resulting aqueous admixture to permit the said catalyst system to initiate and to activate the polymerization of the vinyl chloride until a high yield of polymerized vinyl chloride is produced, and recovering the fine pearl-like granules of polymerized vinyl chloride in the form of fine pearl-like granules thus produced.

10. The process in accord with claim 9 in which the borane is a butyl borane and the hydroperoxide is hydrogen peroxide.

11. The process in accord with claim 9 in which the borane is triisobutyl borane and the hydroperoxide is a butyl hydroperoxide.

12. A process of producing polymerized vinyl chloride in the form of fine pearl-like granules having a high softening temperature of the order of 88° C. to 106° C., and a high flow temperature of the order of 145° C. to 170° C., and a high intrinsic viscosity of the order of 1.10 to 2.25, which method is carried out in the presence of a borane-hydroperoxide catalyst system in circumambient fluid media substantially inert to the borane of the catalyst system and comprises dispersing vinyl chloride and an alkyl borane having 1 to 4 carbon atoms in an aqueous medium of water and an organic solvent selected from the class consisting of methyl, ethyl, propyl, butyl, amyl, hexyl, heptyl and octyl alcohols, glycol, glycerol, acetonitrile, ethylene cyanohydrin, tetrahydrofuran, acetone, methyl ethyl ketone, cyclohexanone, methyl ether, ethyl ether, propyl ether and butyl ether, the ratio of borane to vinyl chloride being higher than 0.5 millimol of borane to 1 mol of vinyl chloride; thereafter admixing into said dispersion a hydroperoxide of the formula ROOH, in which R is selected from the class consisting of hydrogen and a hydrocarbon radical having 1 to 8 carbon atoms, to form within the resulting aqueous admixture a borane-hydroperoxide catalyst system in which the molar ratio of hydroperoxide to borane is higher than 0.5 to 1.0; then agitating the resulting aqueous admixture to assist the said catalyst system to initiate and to activate the polymerization of the vinyl chloride until a high yield of polymerized vinyl chloride is produced; and recovering the fine pearl-like granules of polymerized vinyl chloride thus produced.

13. The process in accord with claim 12 in which the polymerization is carried out at temperatures ranging from about —78° C. to 50° C. is a butyl borane.

14. The process in accord with claim 13 in which the alkyl borane is triisobutyl borane.

15. The process in accord with claim 13 in which the alkyl borane is tri-n-butyl borane.

16. The process in accord with claim 13 in which the hydroperoxide is hydrogen peroxide.

17. The process in accord with claim 13 in which the hydroperoxide is a butyl hydroperoxide.

18. The process in accord with claim 13 in which the hydroperoxide is cumene hydroperoxide.

References Cited in the file of this patent

UNITED STATES PATENTS

| | | |
|---|---|---|
| 2,333,634 | Britton et al. | Nov. 9, 1943 |
| 2,674,593 | Condo et al. | Apr. 6, 1954 |
| 2,840,551 | Field et al. | June 24, 1958 |

OTHER REFERENCES

Journal of Polymer Science (I), vol. 26 (1957), pp. 234–236.

Journal of Polymer Science (II), vol. 28 (1958), pp. 227–229.